(12) United States Patent
Louie

(10) Patent No.: US 6,460,287 B1
(45) Date of Patent: Oct. 8, 2002

(54) COMBINATION TACKLE BOX AND FISH CONTAINER LID

(76) Inventor: David Louie, 27 Christine Ct., Staten Island, NY (US) 10312

( * ) Notice: Subject to any disclaimer, the term of this patent is extended or adjusted under 35 U.S.C. 154(b) by 0 days.

(21) Appl. No.: 09/670,318

(22) Filed: Sep. 26, 2000

(51) Int. Cl.$^7$ ............................................. A01K 97/00
(52) U.S. Cl. ............................ 43/54.1; 43/55; 43/57.1; 206/315.11
(58) Field of Search ..................... 43/54.1, 55, 57.1; 206/315.11, 579; 220/505, 524, 254, 826

(56) References Cited

U.S. PATENT DOCUMENTS

| | | | | |
|---|---|---|---|---|
| 204,168 A | * | 5/1878 | Roney | 43/55 |
| 566,903 A | * | 9/1896 | Gieschen | 43/55 |
| 1,080,551 A | * | 12/1913 | Hartwell | 43/55 |
| 1,725,684 A | * | 8/1929 | Sullivan | |
| 2,629,644 A | * | 2/1953 | Heys | 43/57.1 |
| 4,128,170 A | | 12/1978 | Elliott | |
| 5,305,544 A | * | 4/1994 | Testa, Jr. | 43/54.1 |
| 5,319,877 A | | 6/1994 | Hagan | |
| 5,337,892 A | | 8/1994 | Zaffina | |
| 5,659,995 A | | 8/1997 | Hoffman | |
| 5,755,057 A | | 5/1998 | Dancer | |
| 5,864,981 A | * | 2/1999 | Zeman | 43/54.1 |
| 6,259,587 B1 | * | 7/2001 | Sheldon et al. | 361/23 |

* cited by examiner

Primary Examiner—Kurt Rowan
(74) Attorney, Agent, or Firm—Shlesinger, Arkwright & Garvey LLP

(57) ABSTRACT

A fishing accessory for a container has two lids, one for access to the container for storing bait or live fish and another for access to a compartment used for storing fishing accessories including hooks, sinkers and lures. Each lid is hinged independently which allows access to the container independently of the other compartment.

11 Claims, 2 Drawing Sheets

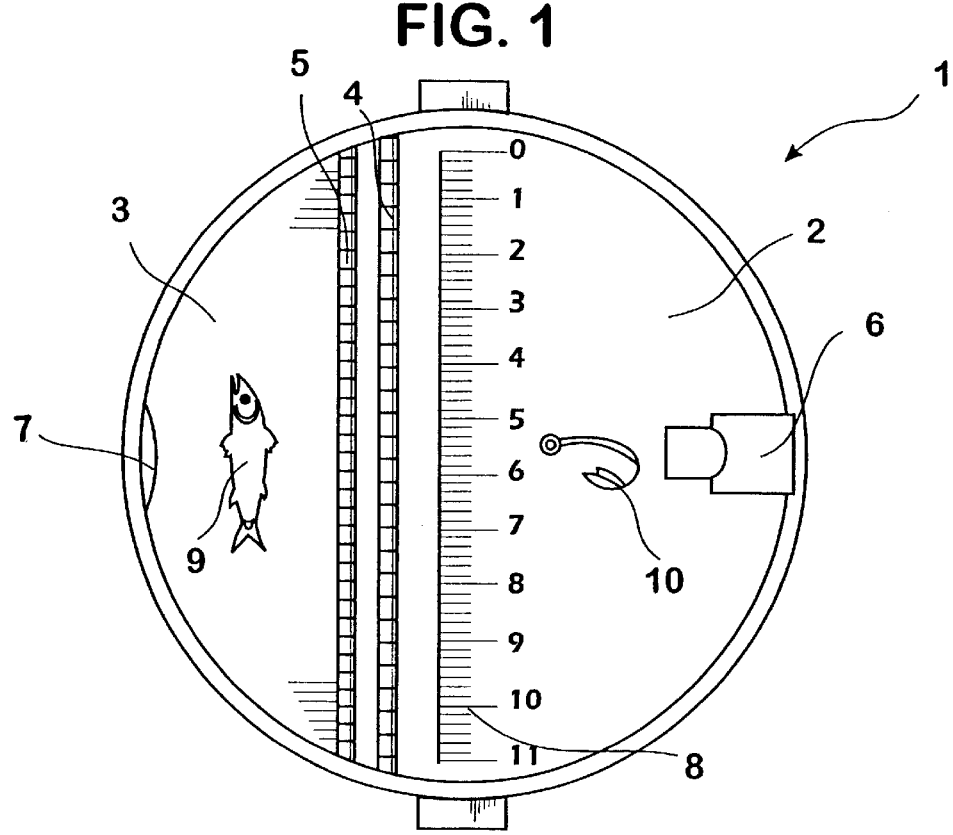
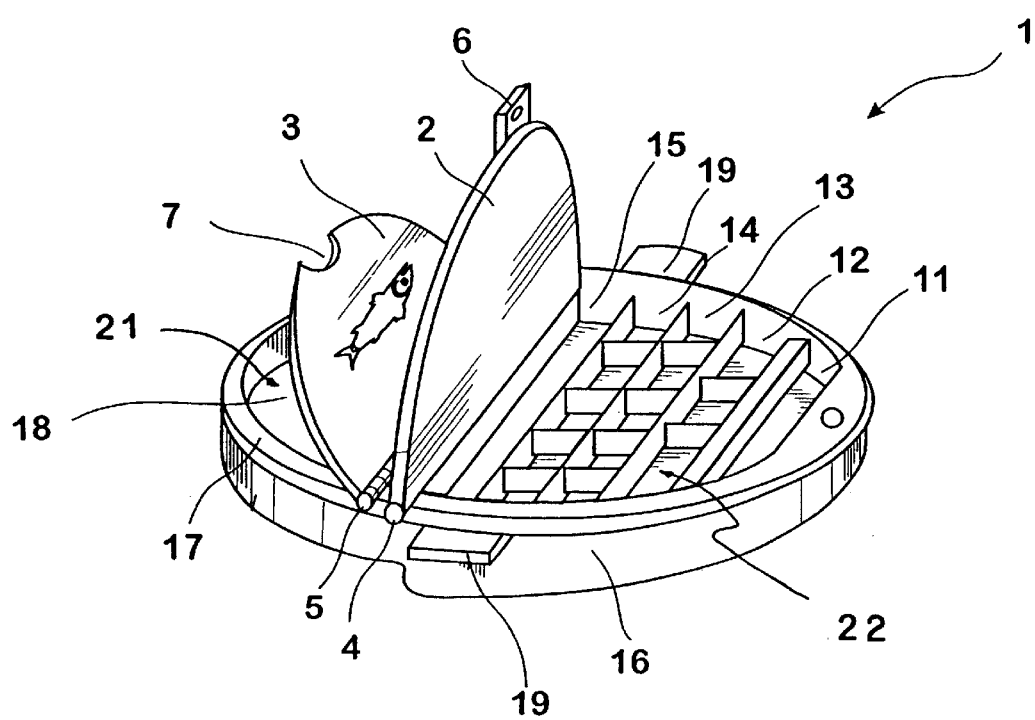

COMBINATION TACKLE BOX AND FISH CONTAINER LID

BACKGROUND OF THE INVENTION

This invention relates, in general, to fishing accessories, and, in particular, to a fishing accessory adapted to engage a container and that has dual compartments, one of which serves as a tackle box and the other serves as access to the container.

DESCRIPTION OF THE PRIOR ART

In the prior art various types of fishing accessories have been proposed. For example, U.S. Pat. No. 4,128,170 to Elliott discloses a combination tackle box, bait holder, cooler and seat. In addition, Elliott discloses a container with a lid and the lid has an opening for access to the container, and compartments in the container. The compartments are covered by a hinged hatch which also serves as a bait well cover. The bait well cover also has removable access cover. U.S. Pat. No. 5,319,877 to Hagan discloses a fishing tackle box which has a main container provided with a ventilated well for accommodating a bait bucket, and a plurality of tackle trays which are stacked in the upper portion of the container. U.S. Pat. No. 5,337,892 to Zaffina discloses a fishing tackle box which has a main container for holding bait or live fish and a plurality of rotating tray compartments mounted in the upper portion of the main container. U.S. Pat. No. 5,659,995 to Hoffman discloses a fishing tackle box which has a main container for holding bait or live fish and an upper container which has a plurality of compartments. The upper container has a lid which has two hinged sections so that the upper compartments can be accessed separately. The patent to Hoffman discloses the upper and lower compartments, similar to the other cited patents, in which the upper compartment must be removed to access the lower compartment. U.S. Pat. No. 5,755,057 to Dancer discloses a fishing accessory container which has a first compartment in the lower portion of the container and a plurality of stacked trays which are positioned above the first compartment in the lower portion of the container.

OBJECTS AND SUMMARY OF THE INVENTION

The present invention is directed to a fishing accessory for a container which has two lids, one for access to the container for storing bait or live fish and another for access to a compartment used for storing fishing accessories including hooks, sinkers and lures. Each lid is hinged independently which allows access to container independently of the other compartment.

It is an object of the present invention to provide a new and improved fishing accessory for a container which allows easy and convenient access to a container and to another section having a plurality of compartments.

It is an object of the present invention to provide a new and improved fishing accessory for a container that includes compartments for storing fishing tackle.

These and other objects and advantages of the present invention will be fully apparent from the following description, a when taken in connection with the annexed drawings.

BRIEF DESCRIPTION OF THE DRAWINGS

FIG. 1, is top view of the present invention.

FIG. 2 is a perspective view of the present invention showing the lids in an open condition.

DESCRIPTION OF THE PREFERRED EMBODIMENT

Figure 3:
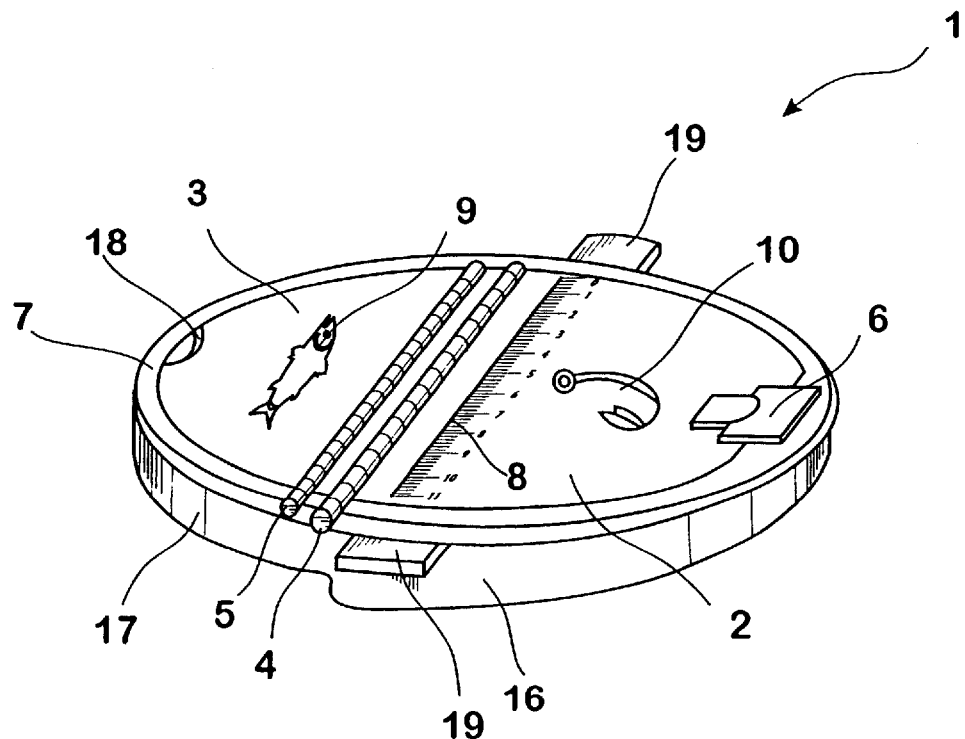
FIG. 3 is a perspective view of the present invention showing the lids in a closed condition.

Referring now to the drawings of the present invention, the accessory has a first lid 2 which is hinged at 4 and a second lid 3 which is hinged at 5. The lids 2 and 3 are associated with respective compartments 21 and 22, as shown in FIG. 2. Each of the lids is separately hinged so the lids can be operated independently for reasons which will be explained in detail below. It should be noted that the piano type hinges 4 and 5 are merely for illustrational purposes, and other types of hinges could be used without departing from the scope of the invention.

As shown in FIG. 1, the lid 2 has an indicia 10, shaped as a fishhook which indicates to a user the contents below the lid 2. In addition, the lid 2 has a measuring device 8 attached in any conventional manner to the top surface of the lid. The measuring device could be used by a fisherman to measure his/her catch. Although the measuring unit shown is in inches, obviously any measuring unit could be used on the measuring device 8. In addition a catch 6 of any conventional design could be used to hold the lid 2 in a closed position, as shown in FIG. 3.

The other lid 3 has an indicia 9 affixed to the top surface of the lid 3 which indicates to a user the contents below the lid 3. In addition, a handle 7, of any conventional design, is affixed to the edge of the lid 3 in any conventional manner to aid the user in lifting the lid 3.

It should be noted that the indicia 9 and indicia 10, as shown, are merely for illustrational purposes and other indicia can be used without departing from the scope of the present invention.

Figure 4:
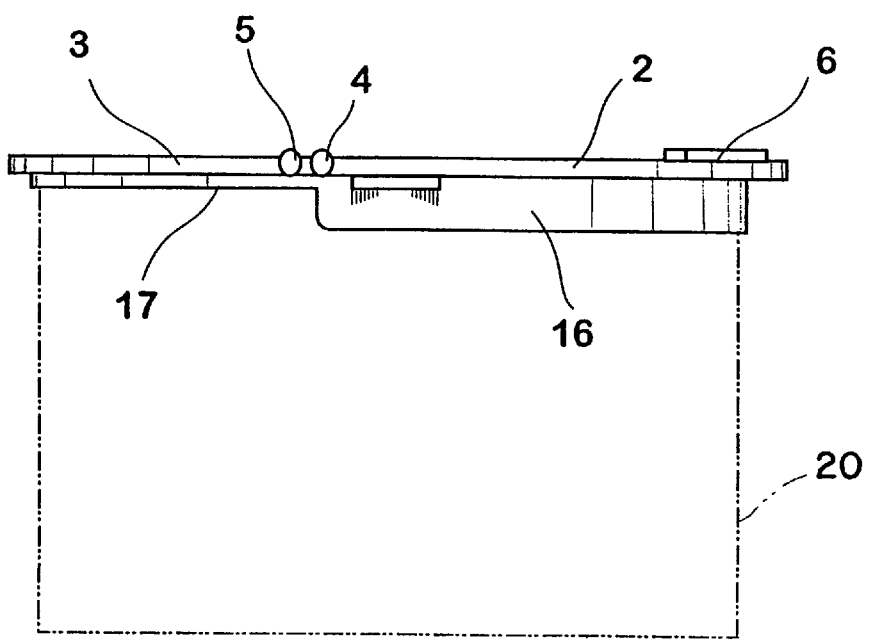
FIG. 4 is a side view of the present invention.

As shown in FIG. 4, the lids 2, 3 are hinged to a cover 1 which can be secured to the top of a container 20 in any conventional manner. The container 20 may be similar to the containers shown in the prior art patents, cited above, and can be used for similar purposes, such as, but not limited to, storing bait or fish which have been caught by the user. The cover 1, as shown in FIG. 2, can be provided with handles 19 which can be used to place the cover 1 onto or remove the cover 1 from the container 20.

As shown in FIGS. 2 and 3, the lids 2, 3 can be opened independently of each other. The lid 3, when raised, would expose an opening 18, which would provide easy and convenient access to the container 20. The lid 2, when raised, would provide easy and convenient access to the storage compartments 11, 12, 13, 14, and 15, which could be used to store fishing implements such as hooks, lures and sinkers.

Also, the section for the storage of fishing implements is deeper, as shown at 16 in FIG. 2, to accommodate such storage. The depth of the storage compartment will not be deep enough to interfere with the use of the container 20. It should also be noted that the arrangement of storage compartments 11, 12, 13, 14, and 15 is merely for illustrational purposes and other arrangements could be used without departing from the scope of the invention.

As shown in FIG. 4, the two lid 2, 3 will extend substantially to the edge 17 of the container leaving only enough of the container to easily mount the cover 1 on the container. In this way, the user will have easy access to the container 20 or the storage compartments 11, 12, 13, 14, and 15. Also, the hinges 4, 5 are mounted toward the center of the container so the user will have unobstructed access to the container 20 or the storage compartments 11, 12, 13, 14 and 15. If the hinges were mounted adjacent the edges of the container 20, when the lids 2, 3 were opened, the lids would partially obscure the container and/or the storage compartments, and might be in the way when a user wanted to retrieve something from the container and/or the storage compartments.

It should be noted that the preferred material for the present invention would be a plastic to ovoid corrosion; however, other materials that will not easily corrode could also be used.

In the prior art patents when a storage compartment for fishing implements, such as hooks, sinkers or lures, has been provided in combination with a container for storing bait or fish, which have been caught by the user, the prior art patents have always made it necessary to remove the storage compartment for fishing implements in order to access the container for storing bait or fish.

With the present invention this inconvenience is not necessary. The lid 3, covering the container 20, can be raised independently from the lid 2, covering the storage compartments 11, 12, 13, 14 and 15 for fishing implements. In this manner, a user would not have to remove the storage compartments for fishing implements in order to access the container for storing bait or fish.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A fishing accessory for a container, comprising:
   a) a cover for the container, said cover having an outer edge defining an outer boundary of said cover;
   b) said cover being divided into first and second compartments having respective first and second lids;
   c) said first and second lids including respective first and second edges extending across said cover and disposed adjacent to each other, said first and second edges dividing said outer edge into respective first and second portions;
   d) said first and second edges being hingedly connected to said cover;
   e) said first compartment having a closed bottom; and
   f) said second compartment having an open bottom and a top opening, said open bottom for communicating with the interior of the container, said top opening being bounded by said second portion and said second edge.

2. A fishing accessory as in claim 1, wherein said outer edge defines a circle.

3. A fishing accessory as in claim 1, wherein said first and second lids are independently hinged to said cover.

4. A fishing accessory as in claim 1, wherein said first and second lids can be opened and closed independently of each other.

5. A fishing accessory as in claim 1, wherein said first and second lids include respective first and second indicias.

6. A fishing accessory as in claim 5, wherein said first indicia includes a representation of a fishhook.

7. A fishing accessory as in claim 5, wherein said second indicia includes a representation of a fish.

8. A fishing accessory as in claim 1, wherein said first lid includes a measuring device.

9. A fishing accessory as in claim 1, wherein said first and second lids are secured to said cover by respective first and second piano-type hinges.

10. A fishing accessory as in claim 1, wherein said cover includes at least one handle.

11. A fishing accessory as in claim 1, wherein said cover includes two handles positioned opposite each other.

* * * * *